United States Patent [19]

Friberg

[11] 4,426,898

[45] Jan. 24, 1984

[54] REGISTRATION CONTROL METHOD FOR A LABEL CUTOFF APPARATUS

[75] Inventor: Nelson Friberg, Toledo, Ohio

[73] Assignee: Owens-Illinois, Inc., Toledo, Ohio

[21] Appl. No.: 456,665

[22] Filed: Jan. 10, 1983

Related U.S. Application Data

[62] Division of Ser. No. 208,712, Nov. 20, 1980, Pat. No. 4,384,500.

[51] Int. Cl.[3] ........................ B23Q 15/12; B26D 5/20

[52] U.S. Cl. .......................................... 83/37; 83/74; 364/475

[58] Field of Search ........................ 83/37, 13, 72-76; 364/475

[56] References Cited

U.S. PATENT DOCUMENTS

| | | | |
|---|---|---|---|
| 3,620,111 | 12/1969 | Bosshard | 83/74 |
| 3,668,957 | 6/1972 | Nido | 83/76 |
| 3,688,620 | 9/1972 | Harris, Jr. | 83/74 |
| 3,706,248 | 12/1972 | Erhart | 83/74 |
| 3,774,016 | 11/1973 | Sterns et al. | 364/475 |
| 4,020,406 | 4/1977 | Tokuno et al. | 83/74 |
| 4,287,797 | 9/1981 | Seragnoli | 83/74 |

*Primary Examiner*—Frank T. Yost
*Attorney, Agent, or Firm*—Gerald T. Welch; Myron E. Click

[57] ABSTRACT

A registration control method for a printed label cutoff machine controls both the location of the cut by performing a phase adjustment and the length of the individual labels by performing a base speed adjustment. A strip of labels have eyemarks printed thereon for defining the location at which the individual labels are to be cut. An optical scanner is positioned adjacent the labels and generates a scanner pulse upon detection of an eyemark. A control circuit includes a setup control for automatically running the machine into registration from an initial setup position. The setup control functions to generate a reference pulse a predetermined distance before the scanner is expected to see an eyemark. When the eyemark is detected within a designated window area the control utilizes the scanner pulse and the reference pulse to calculate the phase error for each label and generate a phase correction signal proportional to the actual phase error. Individual phase error signals are combined to determine the average phase error which has occurred over the last predetermined number of labels. The average phase error is representative of an average base speed error. If the average phase error exceeds a predetermined threshold, the control will generate a base speed correction signal proportional to the average base speed error. When the eyemark is detected outside the designated window area, the control will attempt to bring the eyemark within the window area by performing a full speed phase adjustment. If, after a predetermined number of consecutive labels, the eyemark has not been moved within the window area, the control will check the base speed and perform a base speed adjustment. The control also includes an alphanumeric display for displaying to an operator, on a prioritized basis, messages indicating the operating status of the machine.

10 Claims, 10 Drawing Figures

TO FIG. 5b

FROM FIG. 5b

REGISTRATION CONTROL METHOD FOR A LABEL CUTOFF APPARATUS

This is a division of application Ser. No. 28,712, filed Nov. 20, 1980, now U.S. Pat. No. 4,384,500.

BACKGROUND OF THE INVENTION

1. Field of the Invention:

This invention relates in general to a registration control system for a printed label cutoff apparatus and in particular to a registration control system capable of making both phase and base speed adjustments to the cutoff apparatus. 2. Description of the Prior Art:

A printed label cutoff machine typically includes a pair of feed rolls for moving a sheet of printed labels continuously between a pair of cutting wheels. The cutting wheels generally include at least one cutting blade which makes a single transverse cut along the sheet during each revolution thereof. The particular point at which the labels are to be severed is defined by a registration mark or an eyemark printed on the sheet along with the printed portion of the labels. Most prior art registration control systems utilize an optical scanner positioned adjacent the printed sheet which produces a pulse whenever a registration mark passes the scanner. Generally, the location of the cut is controlled by controlling the speed at which the labels are fed through the cutting rolls. Alternatively, the cut location can also be controlled by controlling the speed of rotation of the cutting rolls.

An example of a prior art registration control system is disclosed in U.S. Pat. No. 3,774,016 to Sterns et al. The control system includes an optical scanner for detecting a registration mark, and a knife cut detector for producing a knife pulse whenever the cutting wheels produce a knife cut. In addition, the system includes a measuring wheel which rides on the web to produce a series of pulses as the web moves along so that each pulse corresponds to a given distance of web movement. A number proportional to the distance between the scanner and the location where a registration mark should be when a proper knife cut is to be made is preset manually into a counter. The number loaded into the counter represents the number of measuring wheel pulses which should occur between the detection of a registration mark and the occurrence of a knife pulse.

Each time a scanner pulse is generated, the control opens a gate which allows the measuring wheel pulses to be applied to a count down terminal of the counter. The occurrence of the knife pulse freezes the count. If the knife pulse occurs before the counter has counted down fully, the remaining count in the counter represents the deviation or distance the cut was short. On the other hand, if the knife pulse occurs after the counter counts down to zero, the counter is switched to the up counting mode until the knife pulse occurs. In this case, the count in the counter represents the deviation or distance the cut was long. The control system utilizes the measured deviation of the cut location to generate an individual deviation correction signal to adjust the speed of the cutting wheels through a differential mechanism for the next cut. The control also processes the measured deviation which previously obtained deviation measurements to generate an average deviation correction signal to further adjust the speed of the cutting wheels for the next cut.

Another prior art registration control system is manufactured by Econ Corporation as Model No. 820. The Econ system can control a label cutoff machine which includes means for adjusting both the length of the individual labels, and the location of the cut. These two adjustments are typically referred to as a base speed adjustment and a phase adjustment respectively.

The Econ system utilizes a special encoder coupled to the cutting wheels which produces a predetermined number of pulses and a single reference pulse per revolution of the cutting wheels. The encloder includes means for adjusting the point of revolution at which the reference pulse is generated. The duration of the reference pulse defines a window area in which the scanner is expected to see an eyemark. The difference between the occurrence of a reference mark and the occurrence of a scanner pulse is measured in terms of encoder pulses. This difference represents the phase error and is used to produce a phase correction signal for making a phase adjustment. In the Econ system, if the eyemark is detected outside the designated window area, the control is lost and cannot automatically bring the machine into registration. The operator must then use manual controls to bring the machine into registration.

The Econ control monitors the individual phase errors to determine whether a base speed adjustment should be made. If the phase error exceeds an operator selected threshold for an operator selected number of consecutive labels, the control will adjust the base speed by a preset amount, without reference to the actual amount of phase error. Thus, if the phase errors for the required number of labels have been exceeded the threshold by a relatively large amount, the same base speed adjustment is made as if the phase errors have each just exceeded the threshold by a relatively small amount.

SUMMARY OF THE INVENTION

The present invention provides a registration control system which has several advantages over the prior art systems. First, the present system includes a setup control for automatically running the machine in registration from an initial setup position. The setup control eliminates the need for an operator to manually preset a counter, as was required in the above-discussed Sterns patent, and also eliminates the need for an operator to manually adjust the point at which the reference mark is generated by the encoder, as was the case for the above-described Econ system. The present invention utilizes an encoder coupled to the cutting wheels which generates a predetermined number of pulses per revolution of the cutting wheels, and a single encoder reference pulse per revolution.

In the present invention, the particular point of rotation at which the encoder reference pulse is generated is not critical. The setup control functions to generate a new reference pulse a predetermined distance before the scanner is expected to see an eyemark. The previously mentioned initial setup position is obtained by the operator by cutting the label sheet at one of the eyemark locations and feeding the label sheet up to the cutting wheels which have been positioned with the cutting blade in its cut position. Next, the operator uses manual control switches to jog the machine forward until an eyemark is in line with the optical scanner. This defines the initial setup position. Thereafter, the setup control enables a first counter to count the number of encoder pulses which occur until the next encoder reference signal is generated. The count total in the counter represents the number of encoder pulses which occur between the time when the scanner is expected to see an eyemark, and the time when the encoder generates the encoder reference pulse. This count is preloaded into a second counter each time the encoder generates an encoder reference pulse. The second counter is then connected to count encoder pulses and to generate the new reference pulse when the counter reaches a count corresponding to the number of encoder pulses generated per revolution. If desired, the first counter can initially be preloaded by an additional amount to define a window area wherein the eyemark is normally expected to be found. This causes the setup control to generate the new reference pulse a predetermined distance before the scanner is expected to see an eyemark.

The new reference pulse, the encoder pulses, and the scanner pulse are supplied to a phase control for calculating the phase error for each label. If the eyemark is detected within the designated window area, the control generates a phase correction signal proportional to the actual phase error to adjust the location of the cut. The individual phase error signals are combined to determine an average phase error which has occurred over the last predetermined number of labels. This average phase error is representative of the average base speed error. In accordance with the present invention, if the average phase error exceeds a predetermined threshold, the control will generate a base speed correction signal proportional to the average base speed error.

The control system according to the present invention is also capable of bringing the machine into registration when the eyemark has been detected outside the designated window area. In this case, the phase control will attempt to bring the eyemark within the window area by performing a "full speed" phase adjustment. A full speed phase adjustment consists of running the phase adjustment means full speed in the desired direction. If, after a predetermined number of consecutive labels, the eyemark has not been moved into the window area, the control will check the base speed and perform a base speed adjustment. Once the eyemark has been moved within the designated window area, the control will switch back to the above-described method wherein the phase correction signal is generated proportional to the average phase error.

Another feature of the present invention includes an alphanumeric display which is utilized to display to the operator messages relating to the operation of the machine. The messages are displayed on a prioritized basis to inform the operator of which mode the machine is in and, if there are any problems, what these problems might be.

DESCRIPTION OF THE PREFERRED EMBODIMENT

Figure 1:
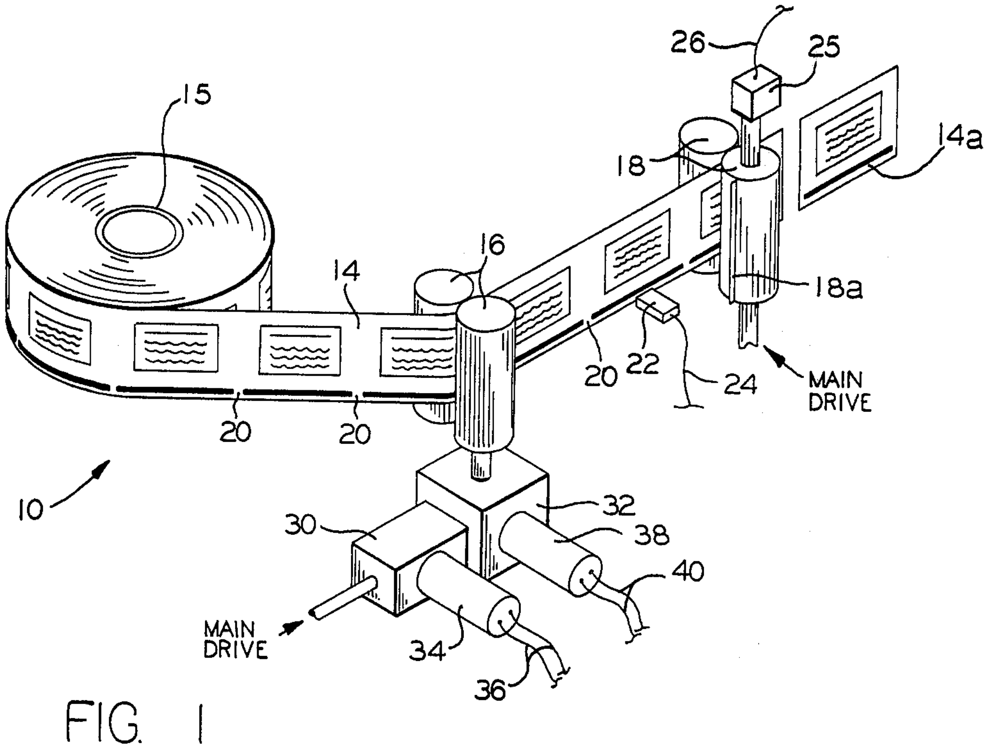
FIG. 1 is a schematic perspective view of a printed label cutoff machine which can be controlled by the registration control circuit of the present invention.
Figure 2:
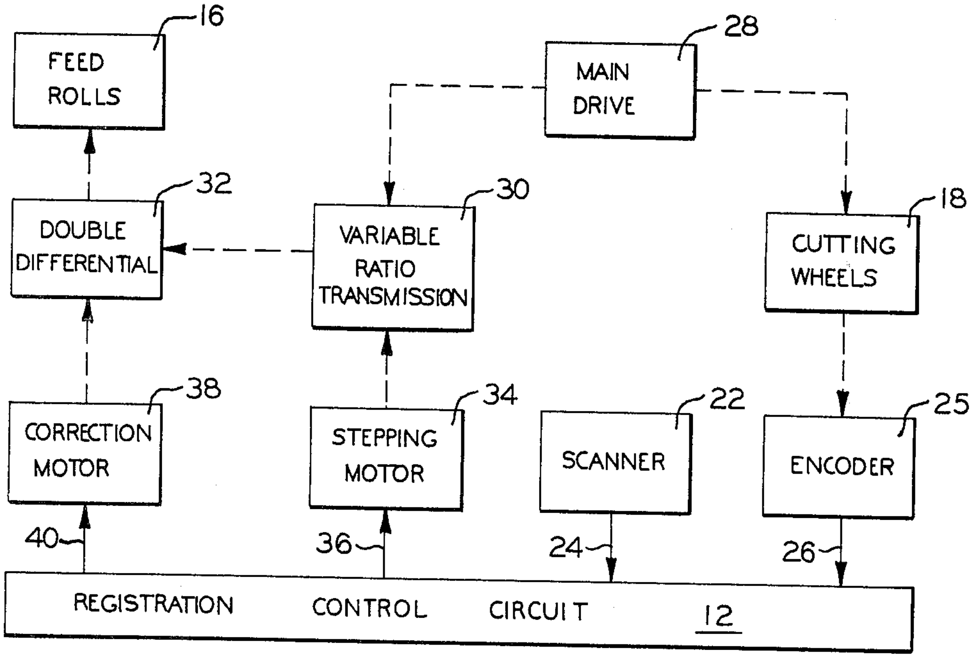
FIG. 2 is a block diagram of the machine of FIG. 1 showing the mechanical interconnections between the machine elements, along with the electric connections to a registration control circuit.

Referring to FIG. 1, there is shown a schematic perspective view of a printed label cutoff machine 10 which can be controlled by a registration control circuit according to the present invention. There is shown in FIG. 2 a block diagram of the machine of FIG. 1 showing the mechanical interconnections between the machine elements, along with the electrical connections to a registration control circuit 12. In FIG. 2, the mechanical interconnections are represented by dashed lines, while the electrical connections are shown in solid lines. FIGS. 1 and 2 will be discussed together.

In FIG. 1, a supply of printed labels is provided as a continuous sheet 14 which has been rolled onto a rotatable spool 15. The sheet of printed labels is passed through a pair of feed rolls 16 and then through a pair of cutting wheels 18 where individual labels 14*a* are severed by a cutting blade 18*a* mounted on the periphery of one of the cutting wheels.

The particular point at which the labels are to be severed is defined by a registration mark or an eyemark 20 printed along the bottom edge of the sheet. The individual eyemarks 20 are detected by an optical scanner 22 which generates a signal on a line 24 to the control circuit 12 upon detecting an eyemark. The scanner 22 can be of the type disclosed in U.S. Pat. No. 4,266,123 granted on May 5, 1981, to N. Friberg and assigned to the assignee of the present invention.

An encoder 25 is mechanically coupled to one of the cutting wheels 18 and generates a signal representing the angular position of the cutting blade 18*a* to the control circuit 12 on lines 26. The cutting wheels 18 are driven by a main drive 28 and, as will be discussed, will ideally make one complete revolution for each printed label.

By controlling the rate of rotation of the feed rolls 16, the control circuit 12 can control both the location of the cut and the length of the individual labels 14*a*. The main drive 28 is connected to an input of a variable ratio transmission 30 having an output connected to one of the inputs of a double differential 32. The transmission 30 can be of the type manufactured by Zero-Max Ind. Inc., of Minneapolis, Minn. under the tradename "ZERO-MAX". The output of the double differential 32 is connected to drive the feed rolls 16. A stepping motor 34 is mechanically coupled to an adjusting input of the transmission 30. The stepping motor 34 receives control signals on lines 36 for adjusting the ratio of the transmission 30. The other input to the double differential 32 is provided by a correction motor 38 which receives control signals on lines 40 from the control circuit 12.

Basically, the registration control 12 provides a two-channel means of effecting proper registry of the printed labels. The correction motor 38 can be run for a predetermined time interval to correct the location of the cut so as to compensate for small printing errors. This type of adjustment is typically referred to a phase adjustment. The second channel of control is provided by the stepping motor 34. The stepping motor can be used to adjust the ratio of the transmission 30 to effect a change in the base speed of the labels 14 which in turn controls the length of the individual labels 14*a*. This type of adjustment is typically referred to as a base speed adjustment.

Figure 3A:
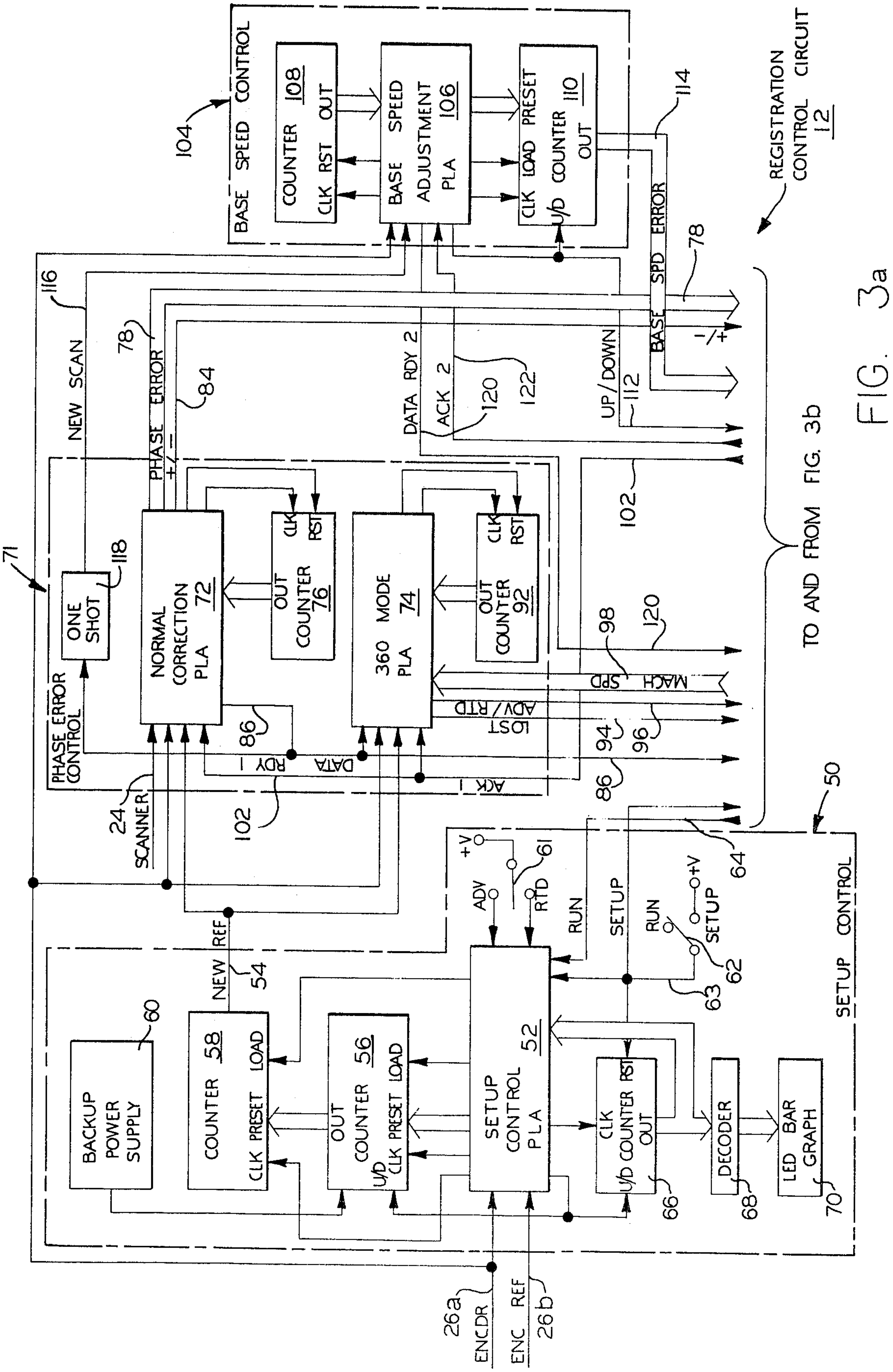
FIGS. 3*a* and 3*b* are block diagrams of the registration control circuit of FIG. 2 according to the present invention.
Figure 3B:
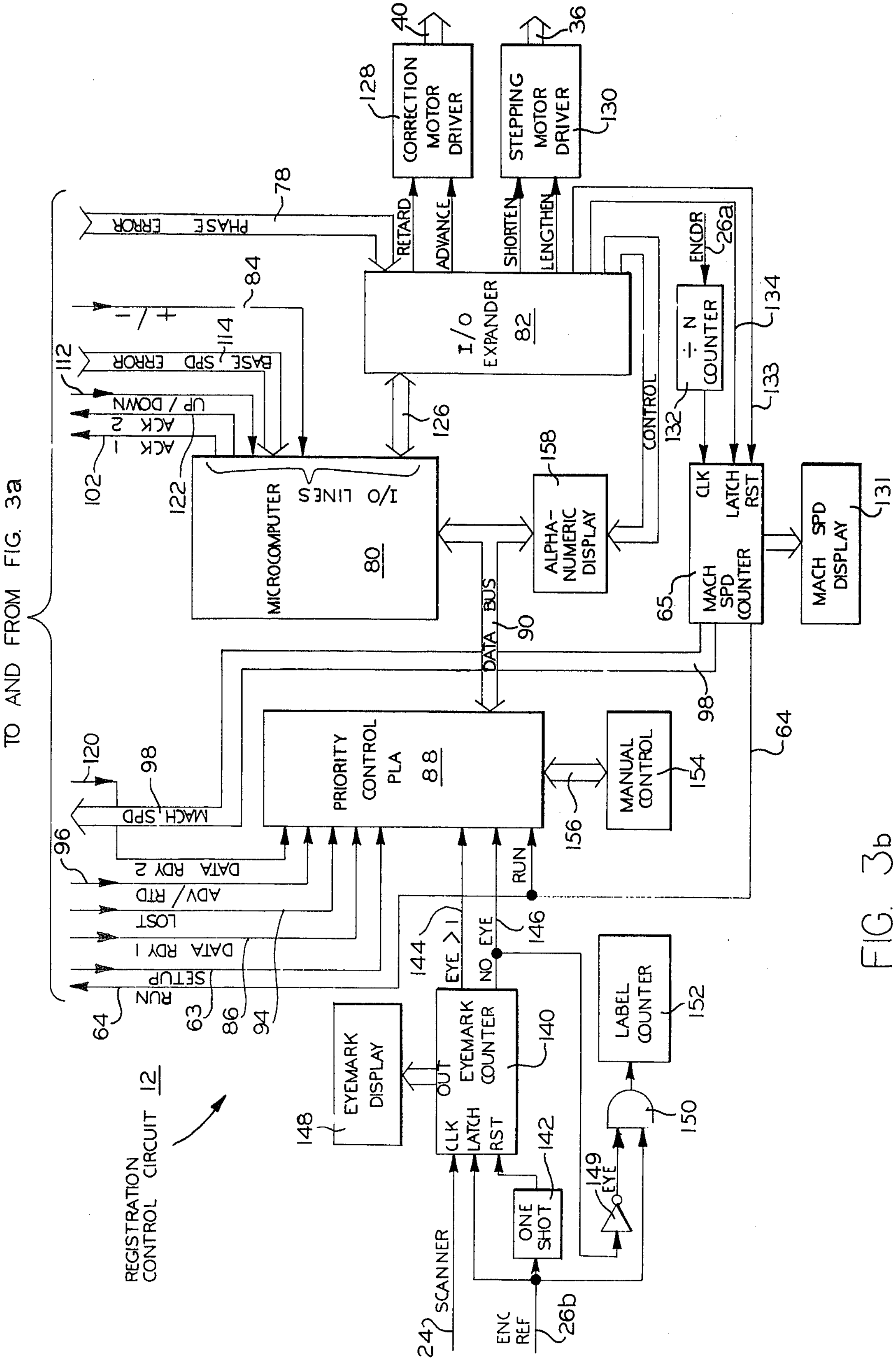

Referring to FIGS. 3*a* and 3*b*, there is shown a block diagram of the registration control circuit 12 according to the present invention. As will be discussed, the major portion of the blocks of FIG. 3*a* and 3*b* represent components which are commercially available. It should be noted at this time that the control circuit 12 utilizes a number of programmable logic arrays (PLA's) to provide a number of control functions. A programmable logic array is typically an integrated circuit having a fixed number of input and outputs. Each PLA is individually programmed to generate certain output signals upon receiving certain input signals. The exact method of programming the PLA's used in the circuit of FIG. 3 will not be discussed in detail. However, the operation of each PLA will be discussed in such detail to allow one of ordinary skill in the art to readily program a PLA to perform the described functions. An example of a PLA which can be used in the circuits of FIGS. 3*a* and 3*b* is manufactured by Signetics Corporation as Model No. N82S1001.

Referring now the left-hand portion of FIG. 3*a*, there is shown a setup control 50 which includes circuitry utilized to control the setup operations of the machine. The main controller of the setup control 50 is a PLA 52. The PLA 52 receives two input signals from the encoder 25. The encoder generates an ENCDR signal on a line 26*a* (one of the lines 26) which consists of a pulse train each pulse of which represents a predetermined amount of rotation of the encoder shaft. For example, the encoder can generate one thousand pulses per complete revolution of the encoder shaft. Since the encoder shaft is connected directly to the cutting wheels 18, each encloder pulse also represents a predetermined amount of rotation of the cutting wheel. The encoder 26 also generates an ENC REF signal on a line 26*b* (one of the lines 26) to the PLA 52. The ENC REF signal is generated by the encoder as a single pulse for each complete revolution of the encoder shaft. Thus, if the ENCDR signal consists of one thousand pulses per revolution, an ENC REF pulse will be generated on the line 26*b* for each one thousand ENCDR pulses on the line 26*a*.

Basically, the setup control 50 functions to generate a NEW REF pulse on the line 54 at a predetermined distance (time) before the scanner 22 is expected to see an eyemark 20. In some prior art devices, the NEW REF pulse was actually the same as the ENC REF pulse. The operator of this type of prior art registration machine would manually set the time at which the prior art encoder generated the ENC REF pulse to coincide with the desired time for the NEW REF pulse. Thus, in these prior art machines, the NEW REF pulse and the ENC REF pulse were essentially the same. In accordance with the present invention, control means are provided for automatically calculating the location at which the NEW REF pulse is to be generated. The present invention eliminates the need for the operator to manually adjust the angular position at which the encoder generates the ENC REF pulse, thereby permitting the machine to utilize a simple encoder which does not provide means for adjusting the ENC REF pulse.

The setup control 50 utilizes two separate counters 56 and 58 for generating the NEW REF signal on the line 54. Each of the counters 56 and 58 is typically capable of counting up to a number equal to the number of ENCDR pulses generated on the line 26*a* for one complete encoder shaft revolution. Thus, if the encoder 25 generates one thousand ENCDR pulses on the line 26*a* per revolution, the counters 56 and 58 would each be one thousand count counters. A one thousand count counter can be constructed, for example, by utilizing three cascaded Model No. MC14029B binary/decimal-up/down counters manufactured by Motorla Semiconductors.

The counter 56 has a preset input connected to receive a preset signal from the setup control PLA 52. The counter 56 also has a clock input, a load input, and an up/down input connected to receive signals generated on output lines of the PLA 52. The counter 58 has a preset input connected to receive the output from the counter 56. The counter 58 also has a clock input and a load input connected to receive signals from output lines of the PLA 52. An output terminal of the counter 58 is connected to generate the NEW REF signal on the line 54. A backup power supply 60 is connected to supply power to the counter 56 in the event of a power failure.

Although the control 50 will automatically determine the angular position of the cutting blade at which the NEW REF pulse is to be generated, the present invention provides means to enable the operator to manually adjust the position at which the NEW REF pulse is generated. A manual advance/retard switch 61 has one terminal connected to a +V power supply. The switch 61 can be manually moved by the operator to an ADV position to generate a signal to the PLA 52 to advance the position at which the NEW REF signal is generated, or the switch can be moved to a RTD position to generate a signal to the PLA 52 to retard the NEW REF signal. A run/setup switch 62 is connected to generate a SETUP signal to an input of the PLA 52 on a line 63. The SETUP signal is generated to the PLA 52 by moving the switch 62 from a RUN position to a SETUP position to supply the +V voltage signal to the PLA 52. The PLA 52 receives a RUN signal on a line 64 from a machine speed counter 65.

The setup control 50 contains a third counter 66 which is utilized in combination with a decoder 68 and an LED bar graph 70 to provide the operator with a visual indication as to how far he has moved the NEW REF signal from the originally calculated location. The counter 66 has a clock input and an up/down input connected to receive signals from the output lines of the PLA 52. The counter 66 has a reset input connected to receive the SETUP signal on the line 63. The output of the counter 66 is supplied to both the decoder 68 and to input terminals of the PLA 52. The decoder 68 decodes the counter output signals to generate output signals to drive the LED bar graph 70.

Figure 4A:
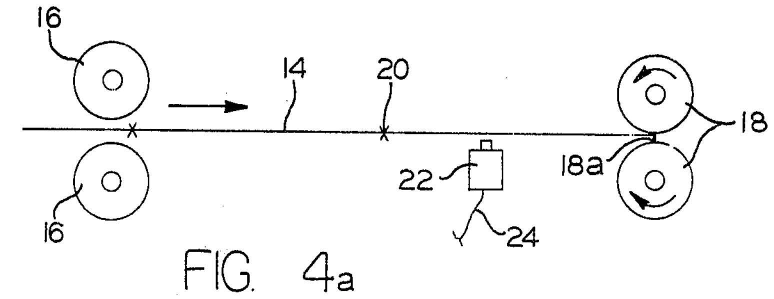
FIGS. 4*a* and 4*b* are schematic illustrations of operations which are performed by a operator before the setup control of FIG. 3*a* is actuated.
Figure 4B:
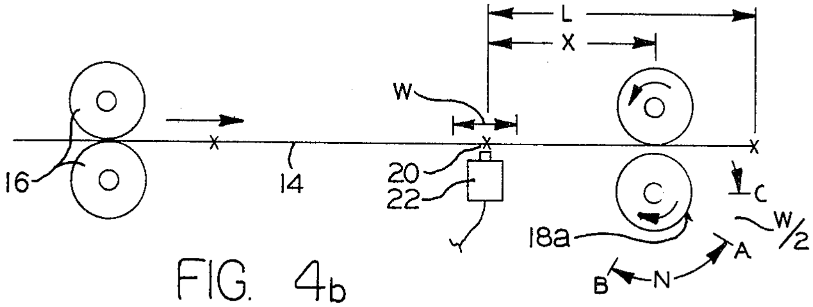

The operation of the setup control 50 will be discussed in conjunction with FIGS. 4*a*, 4*b*, and 4*c*. FIGS. 4*a* and 4*b* illustrate two operations which must be performed by the operator before he actuates the run/setup switch 62. First, the operator cuts the label roll 14 at one of the desired eyemark locations 20, opens the feed rolls 16, and then feeds the label roll up to the cutting wheels 18, as shown in FIG. 4*a*. The cutting wheels 18 are positioned such that the cutting blade 18*a* is in its cut position. Next, as shown in FIG. 4*b*, the operator will close the feed rolls 16 and use manual control switches (not shown) to jog the machine forward until an eyemark 20 is aligned with the eye of the scanner 22. As the machine is jogged forward, the cutting blade 18*a* will rotate to an angular position A which represents the position that the cutting blade should always be in when the eyemark 20 is aligned with the scanner 22. When the machine is running at its proper base speed, the printed labels 14 will move a distance L, which corresponds to the length of an individual label 14*a*, for each complete rotation of the cutting blade 18*a*.

As previously mentioned, the control circuit 50 functions to generate the NEW REF pulse a predetermined distance before the scanner 22 expects to see an eyemark 20. Typically, this distance is one half of a window length W in which the control circuit 12 normally expects to see an eyemark 20. Thus, in FIG. 4*b*, the NEW REF signal is generated when the cutting blade 18*a* is at an angular position C. The number of ENCDR pulses generated by the encoder 25 in moving the cutting blade from point C to point A is represented in FIG. 4*b* was W/2. Assume, for example, that the encoder 25 generates the ENC REF pulse when the cutting blade is at an angular position B, which is N ENCDR pulses from point A. In order to generate the NEW REF signal at point C, the NEW REF signal must be generated N pluse W/2 encoder pulses before the ENC REF signal is generated.

Figure 4C:
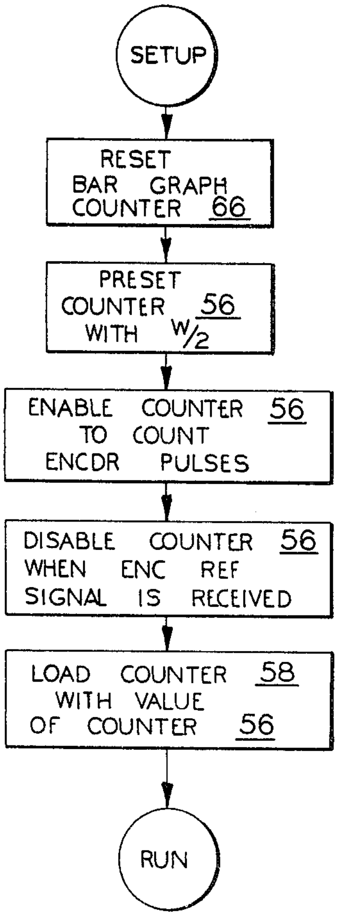
FIG. 4*c* is a simplified flow diagram which illustrates the operation of the setup control of FIG. 3*a* after the operator has performed the operations of FIGS. 4*a* and 4*b.

Referring to FIG. 4*c*, there is shown a simplified flow diagram which illustrates the operation of the set up control 50 after the operator has performed the operations of FIGS. 4*a* and 4*b* and actuated the setup switch 62. The control exits a circle "SETUP" and enters a processing function "RESET BAR GRAPH COUNTER 66" which resets the counter 66 to generate a zero output signal to the decoder 68. The decoder in turn generates a signal to the LED bar graph 70 which centers the bar graph. Next, the control enters a processing function "PRESET COUNTER 56 With W/2". The control PLA 52 generates a load signal to the counter 56 to preset the counter with a count equal to W/2. After the counter 56 has been preset, the machine enters a processing function "ENABLE COUNTER 56 TO COUNT ENCDR PULSES" by setting the up/down line to the up mode, and supplying the ENCDR pulses on the line 26*a* to the clock input of the counter 56.

After the counter 56 has been enabled, the main drive is engaged to rotate the feed rolls and the cutting wheels. As the cutting wheels are rotated, the encoder 25 generates ENCDR pulses to the clock input of the counter 56. The counter 56 will continue to count the ENCDR pulses until the PLA 52 receives an ENC REF pulse on the line 26*b*. At this time, the control enters a processing function "DISABLE COUNTER 56 when ENC REF SIGNAL IS RECEIVED". The PLA will then disconnect the line 26*a* from the clock input of the counter 56. The counter 56 now contains a count equal to W/2 plus the number N of encoder pulses generated between angular position A and angular position B. The control then enters a processing function "LOAD COUNTER 58 WITH VALUE OF COUNTER 56". The PLA 52 will then generate a load signal to the counter 58 to preset the counter 58 with the value of the counter 56. Next, the PLA 52 will supply the ENCDR pulses on the line 26*a* to the clock input of the counter 58. The counter 58 continues to count ENCDR pulses until it reaches its maximum count, which, as previously mentioned, corresponds to the number of ENCDR pulses per revolution and the NEW REF pulse is generated on the line 54.

Since the counter 58 is preset with the value N plus W/2, the NEW REF signal on the line 54 will be generated N plus W/2 counts before the ENC REF signal and W/2 counts before the scanner 22 is expected to see an eyemark 20. Thereafter, the PLA 52 will load the counter 58 with the output of the counter 56 each time an ENC REF pulse is received on the line 26*b*.

Once the machine is running, the operator can selectively advance or retard the NEW REF pulse on the line 54 by utilizing the switch 61. When the operator moves the swith 61 to the ADV position to advance the NEW REF pulse, the PLA 52 will generate pulses at a relatively low frequency rate to the clock input of the counter 56. Each pulse supplied to the counter 56 is also supplied to the clock input of the counter 66. The decoder 68 decodes the output of the counter 66 and generates a signal to the LED bar graph 70 to indicate to the operator how far he has advanced the NEW REF pulse. The output of the counter 66 can also be supplied to the PLA 52 which can be programmed to limit the adjustment which can be perfomed by the operator. For example, when the counter 66 reaches a predetermined count, the PLA 52 can be programmed to inhibit any more pulses to increment the counter 56, even if the switch 61 is in the ADV position. When the operator desires to retard the NEW REF pulse, he moves the switch 61 to the RTD position to generate a retard signal to the PLA 52. The PLA 52 wil then generate a signal to the counters 56 and 66 to set them in the down counting mode. The low frequency pulse is then supplied to the clock inputs of the counters 56 and 66 to decrement the respective counters. The decoder 68 will generate signals to the LED bar graph 70 to indicate to the operator how far the NEW REF pulse has been retarded. As was the case with the manual advance mode, the PLA 52 can also be programmed to limit the amount at which the operator can retard the NEW REF signal.

The NEW REF signal on the line 54 is supplied to a phase error control 71 which includes two programmable logic arrays, a normal correction PLA 72 and a 360 mode PLA 74. As will be discussed, the PLA 72 is utilized to provide control signals for correcting for normal phase errors. Normal errors are defined as phase errors wherein the eyemark is detected within the window area W. On the other hand, the 360 mode PLA 74 is utilized to correct for larger phase errors which occur when the eyemark is detected outside of the window area W.

In addition to receiving the NEW REF signal on the line 54, the PLA 72 receives the ENCDR pulses on the line 26*a* and a SCANNER signal on the line 24. The SCANNER signal consists of a pulse generated each time the scanner 22 detects an eyemark 20 or what appears to be an eyemark. The PLA 72 is connected to receive the output of a counter 76 which has a clock input and a reset input connected to receive output signals from the PLA 72. The counter 76 typically has a maximum count equal to the desired window area W. The counter 76 can be, for example, a Model No. MC14040 manufactured by Motorola Semiconductors. The PLA 72 generates a PHASE ERROR signal on lines 78 which is supplied to a microcomputer 80 through an I/O expander 82. (FIG. 3*b*). The PLA 72 generates a +/− signal on a line 84 which is connected directly to the microcomputer 80. The +/− signal informs the microcomputer 80 whether the correction motor is to run in an advance or a retard direction. The PLA 72 generates a DATA RDY 1 signal on a line 86 to signal the microcomputer 80 that the PLA 72 has calculated a PHASE ERROR signal which must be read by the microcomputer. The DATA RDY 1 signal on the line 86 is supplied to the PLA 74 and a priority control PLA 88 (FIG. 3*b*). After the microcomputer has acknowledged the DATA RDY 1 signal, the microcomputer generates an ACK 1 signal on a line 102 to clear the DATA RDY 1 signal and inform the PLA 72 that the data has been read. As will be discussed, the microcomputer 80 periodically reads the PLA 88 via a data bus 90 to determine whether there is a PHASE ERROR signal to be read.

The 360 mode PLA 74 is connected to receive the output of a counter 92 which has a clock input and a reset input connected to receive signals from the output lines of the PLA 74. The counter 92 typically has a maximum count equal to the number of ENCDR pulses per revolution. The counter 92 can be, for example, a Model MC14040 manufactured by Motorola Semiconductors. The PLA 74 generates a LOST signal on line 94 and an ADV/RTD signal on the line 96 to the PLA 88. The PLA 74 receives a MACH SPD signal on lines 98 from the machine speed counter 65. As will be discussed, the counter 65 is utilized to inform the operator of the machine speed.

As previously mentioned, both the normal correction PLA 72 and the 360 mode PLA 74 are utilized to correct for any phase error by generating signals to the microcomputer 80 to control the correction motor. The normal correction PLA 72 will generate a PHASE ERROR signal on the line 78 when the eyemark 20 is detected within the predetermined window. In accordance with the present invention, the correction signal applied to the correction motor is proportional to the actual phase error. When the eyemark is detected outside the designated window area, the 360 mode PLA is utilized to control the correction motor. Typically, when the eyemark is detected out of the window area, the phase error is so great that the full correction cannot be made within one label. Thus, the 360 mode PLA 74 will simply signal the microcomputer 80 in which direction the correction motor is to be driven. The microcomputer 80 will then run the correction motor full speed until the eyemark begins to fall within the window area, at which time the normal correction PLA 72 takes over to generate correction signals proportional to the actual phase error.

The operations of the PLA 72 and 74 will now be discussed in more detail. When the NEW REF signal is received by the PLA's 72 and 74 on the line 54, the PLA 72 will generate a signal to reset the counter 76 and the PLA 74 will generate a signal to reset the counter 92. At this time, the PLA's 72 and 74 will supply the ENCDR pulses on the line 26*a* to the clock inputs of the counters 76 and 92. As previously mentioned, the count of the counter 76 corresponds to the designated window count, while the count of the counter 92 typically corresponds to the number of encoder pulses per revolution. The first scanner pulse generated on the line 24 after the PLA 72 receives a NEW REF signal on the line 54 will cause the PLA 72 to freeze the count of the counter 76. Also, when the PLA 72 receives the scanner pulse on the line 24, the PLA 72 will generate the DATA RDY 1 signal on the line 86 to the 360 mode PLA 74 and the priority control PLA 88. The DATA RDY 1 signals the PLA 74 to freeze the count of the counter 92.

If the first scanner pulse generated on the line 24 is received by the PLA 74 before the counter 76 reaches its maximum count, the eyemark is detected within the window area W such that the PLA 72 will control the correction motor. At this time, the count of the counter 76 is representative of any phase error in the system. For example, if the counter 76 is a one hundred count counter corresponding to a window area of one hundred encoder pulses, a count of fifty indicates that the scanner pulse was received fifty ENCDR pulses after the NEW REF pulse was generated. However, since the NEW REF pulse is intentionally generated one half the number of window pulses prior to the time when a scanner pulse is to be received, a count of fifty in the counter 76 will represent a zero phase error. However, if the counter 76 has a count of twenty-five when the scanner pulse is received, this is an indication that the scanner pulse was received twenty-five counts before it was expected. In this case, the PLA 72 reads the output of the counter 76 to generate a signal on the line 78 directly proportional to the amount of phase error. The PLA 72 will then generate the +/− signal to direct the microcomputer to run the correction motor in the proper direction to correct the error. A count of less than fifty will indicate that the correction motor must be retarded, while a count between fifty and one hundred will indicate that the correction motor must be advanced.

If the scanner pulse on the line 24 is received by the PLA 72 after the counter 76 has reached its maximum count, the 360 mode PLA 74 will control the correction motor. The PLA 74 is programmed to generate the LOST signal to the priority control PLA 88 when the count of the counter 92 reaches the maximum count of the counter 76. The LOST signal informs the microcomputer that the eyemark has been detected out of the window area and that the PLA 74 will be generating the control signals for the correction motor. When the PLA 72 eventually receives the scanner pulse on the line 24, the DATA RDY 1 signal is generated on the line 86 to freeze the count of the counter 92. At this time, the count of the counter 92 represents the amount of phase error of the detected eyemark. As previously mentioned, the PLA 74 decodes the count of the counter 92 to generate an ADV/RTD signal to the PLA 88 to signal the microcomputer in which direction the correction motor should be run.

As shown in FIG. 3*a*, the PLA 74 also receives the MACH SPD signal on the lines 98. The PLA 74 utilizes the signal from the lines 98, which is representative of the machine speed, in conjunction with the output of the counter 92 to determine whether or not and how the correction motor should be advanced or retarded. For example, if the counter 92 is a one thousand count counter and the designated window area is one hundred counts, a counter reading of two hundred fifty indicates that the eyemark was received two hundred counts later than expected. Thus, the correction motor must be advanced to correct the phase error. If the machine is running at a relatively high rate of speed, there is no problem running the correction motor full speed in either direction, since the phase error of the subsequent label will soon be sampled. However, if the machine is running at a relatively slow rate, running the correction motor at full speed in the retard direction may result in labels which are too short. It should be noted that labels which are too long do not present any problem with the machine wrapping the labels around a container, since any extra length will overlap. However, labels which are too short may tie up the machine since there is no overlap to hold them on the container. Thus, the machine speed signal is utilized to determine how the correction motor should be advanced or retarded. If the machine is running at a relatively high rate of speed, the PLA will advance the motor for counts below the midpoint of the window and retard the motor for counts above the midpoint. However, as the machine speed decreases, the count of the counter 92 which determines whether or not the motor will be advanced or retarded is lowered such that the correction motor will be advanced for more counts than it is retarded.

There is shown along the right side of FIG. 3*a* a base speed control circuit 104 which is utilized for making base speed adjustments. The circuit 104 includes a base speed adjustment PLA 106 as the main controller. The base speed control 104 utilizes two separate counters 108 and 110 for calculating the base speed error. The counter 108 has a clock input and a reset input connected to receive signals from the PLA 106. The counter 108 generates an output signal to the PLA 106. Typically, the counter 108 has a maximum count corresponding to the number of ENCDR pulses occurring per revolution. The counter 108 can be, for example, a Model MC14040 manufactured by Motorola Semiconductors.

The counter 110 has a clock input, a load input, and a preset input connected to receive signals from the PLA 106. The counter 110 is also connected to receive an UP/DOWN signal from the PLA 106 on a line 112. The output of the counter 110 represents the calculated base speed error and is supplied on lines 114 to the microcomputer 80 as the BASE SPD ERROR signal. The counter 110 can be, for example, a Model MC14040 manufactured by Motorola Semiconductors.

The base speed adjustment PLA 106 has an input connected to receive the ENCDR pulses on the line **26*a*. The PLA 106 also receives a NEW SCAN signal on a line 116 which is connected to an output of a one-shot 118 having an input connected to receive the DATA RDY1 signal on the line 86. The PLA 106 generates a DATA RDY2 signal on a line 120 to the PLA 88, and receives an ACK 2 signal on a line 122 from the microcomputer 80. The PLA 106 generates the UP/DOWN signal on the line 112 to both the up/down input of the counter 110 and to the microcomputer 80**.

Generally, the base speed control 104 functions to generate the BASE SPD ERROR signal on the lines 114 proportional to the actual base speed error. The base speed control 104 determines the amount of base speed error by comparing the number of ENCDR pulses which occur between NEW SCAN pulses with the actual number of ENCDR pulses generated per revolution. If the number of ENCDR pulses occuring between the NEW SCAN pulses equals the number of ENCDR pulses per revolution, the base speed is correct and no adjustment is necessary.

As shown in FIG. 3*a*, the PLA 106 is not connected directly to receive the SCANNER pulse on the line 24, but it is connected to receive the NEW SCAN signal on the line 116 generated by the one-shot 118. The DATA RDY 1 signal on the line 86, which is an input to the one shot 118, is generated when the PLA 72 receives the first SCANNER pulse corresponding to the eyemark which is being kept in registry. Thus, the NEW SCAN signal will consist of one pulse per label, regardless of the number SCANNER pulses being generated per label. Consequently, if the scanner is detecting more than one eyemark pulse per label, the base speed adjustment will be calculated with the particular eyemark kept in registry.

When the PLA 106 receives the NEW SCAN pulse on the line 116, the PLA 106 generates a signal to reset the counter 108, and supplies the ENCDR pulses on the line **26*a* to the clock input of the counter 108. The PLA 106 then monitors the output of the counter 108. When the output of the counter 108 reaches a predetermined count, the PLA 106 will generate a load signal to the counter 110 and preset the counter 110 with a count equal to the number of encoder pulses per revolution minus the predetermined count at which the counter 108 was read by the PLA 106. For example, if the encoder generates one thousand pulses per revolution, and PLA 106 was programmed to preset the counter 110 when the count of the counter 108 was at nine hundred, a count of one hundred would be loaded into the counter 110. Typically, the counter 110 is selected to have a maximum count equal to the maximum expected base speed error. After the counter 110 has been preset, the PLA 106 generates an UP/DOWN signal at a logic level to set the counter 110 in the down counting mode, and supplies the ENDCR pulses on the line 26*a* to the clock input of the counter 110. Hereafter, both counters 108 and 110 will continue to count encoder pulses; however, counter 108 will be counting in the up mode, and counter 110** will be counting in the down mode.

If both counters continue to count the ENCDR pulses, when the counter 108 reaches the count corresponding to the number of encoder pulses per revolution, the counter 110 should be at a zero count. If the NEW SCAN pulse is received by the PLA when the counter 110 is at zero, there is no error in the base speed, since the number of ENCDR pulses occurring between the NEW SCAN pulses equals the number of ENCDR pulses per revolution. On the other hand, if the NEW SCAN pulse is received by the PLA 106 before the counter 110 reaches zero, the PLA 106 disconnects the ENCDR pulses from the clock input of the counter 110 to freeze the count of the counter 110. The count of the counter 110 is then proportional to the amount of base speed error. The PLA 106 will generate the DATA RDY 2 signal to the priority control PLA 88 which in turn signals the microcomputer 80 to read the BASE SPD ERROR signal on the lines 114. In addition to reading the base speed error signal, the microcomputer will also read the UP/DOWN signal on the line 112. If the UP/DOWN signal is at a logic level corresponding to a down counting mode, this indicates that the NEW SCAN pulse was received before the counter 108 reached its maximum count, thus indicating that the actual base speed is greater than the desired base speed.

In summarizing the operation of the base speed control 104, the PLA 106, upon receiving a NEW SCAN signal on the line 116, will reset the counter 108 and supply ENCDR pulses to the counter 108. The counter 108 will then continue to count the ENCDR pulses until it reaches a predetermined count, at which time the PLA 106 will preset the counter 110 with the count corresponding to the number of encoder pulses per revolution minus the predetermined count of the counter 108. The PLA 106 will also generate a signal to the counter 110 to set the counter in the up counting mode. When the PLA 106 receives the new NEW SCAN signal, it freezes the count of the counter 110, and generates a DATA RDY 2 signal to the PLA 88, which in turn signals the microprocessor 80 that the BASE SPD ERROR signal on the line 114 is to be read.

If the NEW SCAN pulse which freezes the count of the counter 110 is received before the counter 110 has counted down to zero, this indicates that the counter 108 has not yet reached its maximum value. Since the label sheet has moved a distance equal to the length of one label in less than one complete revolution of the cutting wheels, this indicates that the actual base speed is greater than the desired base speed. The signal on the line 114 will represent this base speed error, and the UP/DOWN signal on the line 112 will inform the microcomputer 80 that the base speed must be reduced. If the NEW SCAN pulse has not been received by the time the counter 108 has reached its maximum value, at which time the counter 110 will be at zero, the PLA 106 will generate a signal to set the counter 110 in the up counting mode. When the NEW SCAN pulse is received, the count of the counter 110 will be frozen at a count proportional to the base speed error. However, at this time the up/down signal on the line 112 will inform the microcomputer 80 that the counter 110 was counting in the up mode, thus indicating that the actual base speed was lower than the desired base speed.

Referring to FIG. 3*b*, there is shown the priority control PLA 88, the microcomputer 80, and the I/O expander 82, which communicate with the control circuits discussed in FIG. 3*a*. The microcomputer 80 can be, for example, a Model 8747 microcomputer manufactured by Intel Corporation, of Santa Clara, Calif. The I/O expander 82 can be a Model 8243 I/O expander which is also available from Intel Corporation. The I/O expander 82 is simply used to provide a larger number of input/output lines to the microcomputer 80.

The microcomputer 80 controls the correction motor 38 by generating an ADVANCE or RETARD signal on the lines 126 through the expander 82 to a correction motor driver 128. The motor driver 128 generates driving signals on the lines 40 to control the correction motor 38. The microcomputer 80 controls the stepping motor 34 by generating a SHORTEN or LENGTHEN signal on the lines 126 through I/O expander 82 to a stepping motor driver 130. The motor driver 130 will then supply the driving signals to the stepping motor 34 on the lines 36.

The microcomputer 80 also generates control signals through the I/O expander 82 to control the machine speed counter 65. As previously discussed, the counter 65 provides the MACH SPD signal on the lines 98 to the 360 mode PLA 74, and the RUN signal to the setup control 50 on the line 64. The counter 65 is connected to generate output signals to a display 131 to provide the operator with a visual indication of the machine speed. The counter 65 and the display 131 can be constructed, for example, from a group of Model 745-0009 counter/displays available from Dialight Corporation. The counter 65 has a clock input connected to receive an output of a divide-by-N counter 132 having an input for receiving the ENCDR pulses on the line 26*a* from the encoder 25. The counter 65 receives a reset signal on a line 133 and a latch signal on a line 134 from the microcomputer 80 through the I/O expander 82. In addition to generating the RUN signal on the line 64 to the setup control 50, the counter 65 also supplies the RUN signal to the priority control PLA 88.

The microcomputer 80 controls the counter 65 and the display 131 by periodically latching the output of the counter 65 into the display 131. The microcomputer 80 then generates a reset signal to reset the counter 65 to count the output of the divide-by-N counter 132. The value N can be selected such that the counter 65 accumulates, between latch signals, a count corresponding to, for example, the number of labels per minute. The counter 65 will generate the RUN signal on the line 64 at one logic level when the machine is stopped, and will generate the RUN signal at another logic level when the machine is running.

Referring to the left-hand portion of FIG. 3*b*, there is shown an eyemark counter 140 which is utilized to count the number of eyemarks 20 the scanner 22 is detecting per label. The counter 140 has a clock input connected to receive the SCANNER pulse on the line 24. The counter 140 also has a latch input connected to received the ENC REF pulse on the line 26*b*. The ENC REF pulse is applied to an input of a one shot 142 which delays the pulse before supplying an output pulse to a reset input of the counter 140.

The counter 140 is connected to generate two output signals to the PLA 88. The first signal, an EYE>1 signal, is generated by the eyemark counter 140 on a line 144 whenever the scanner 22 is detecting more than one eyemark per label. The second signal, a NO EYE signal, is supplied to the PLA 88 on a line 146 when the scanner is not detecting any eye marks. The output of the counter 140 can be supplied to an eyemark display 148, for visually indicating to the operator the number of eyemarks the scanner is seeing per label.

In operation, the counter 140, upon receiving the ENC REF pulse, will latch the output of the counter into the display 148. Since the ENC REF pulse is generated each time the machine cuts a label, the counter output will be latched to the display once per label. After a short predetermined delay, the one shot 142 will then generate an output pulse to reset the counter 140. The counter 140 will then count each pulse which is received on the line 24 until the next ENC REF pulse is generated. The line 144 is connected to an output of the counter 140 such that, when the output is greater than one, and EYE>1 signal is generated on the line 144 to the PLA 88. The line 146 is connected such that, when the counter output equals zero, the NO EYE signal is generated on the line 146 to the PLA 88. The counter 140 and the display 148 can be, for example, a Model 745-0009 counter/display available from Dialight Corporation.

The NO EYE signal on the line 146 is also supplied to the input of an inverter 149 having an output connected to one input of an AND gate 150. The other input to the AND gate 150 is connected to receive the ENC REF pulse on the line 26*b*. The output of the AND 150 is connected to an input of a label counter 152 which functions to count the total number of labels generated by the machine. The inverter 149 inverts the NO EYE signal on the line 146 to supply an EYE signal to the AND gate 150. Whenever the EYE signal is generated as a logic "1" pulse, the AND gate 150 will be enabled to generate a pulse to increment the counter 152. When the scanner is not detecting any eyemarks and the NO EYE signal on the line 146 is at logic "1", the EYE signal applied to the AND gate 150 will be at logic "0", such that no output pulses will be generated by the AND gate 150. Thus, the label counter 152 will not be incremented when no eyemarks are being detected.

However, if the scanner is detecting more than one eyemark per label, the counter will only be incremented once per label since the ENC REF signal will only be generated once per label.

As previously mentioned, the priority control PLA 88 supplies information to the microcomputer 80 on the data bus 90. The priority control PLA 88 can be connected to a manual control 154 by lines 156. The manual control 154 can include switches for manually controlling the operation of the machine elements. For example, the control 154 can include switches for generating the RETARD or ADVANCE signals to the correction motor driver 128, or for generating the SHORTEN or LENGTHEN signals to the stepping motor driver 130.

In accordance with the present invention, the registration control system includes an alphanumeric display 158 which is connected to communicate with the microcomputer 80 by the data bus 90. The alphanumeric display 158 receives control signals from the microcomputer 80 through the I/O expander 82. The alphanumeric display 148 is utilized to display to the operator messages relating the the operation of the machine. As will be discussed, these messages are displayed on a prioritized basis to inform the operator which mode the machine is in and, if there are any problems, what these problems might be. The alphanumeric display can be constructed, for example, from a group of Model DL-1416 displays available from Litronix Corporation.

Figure 5A:
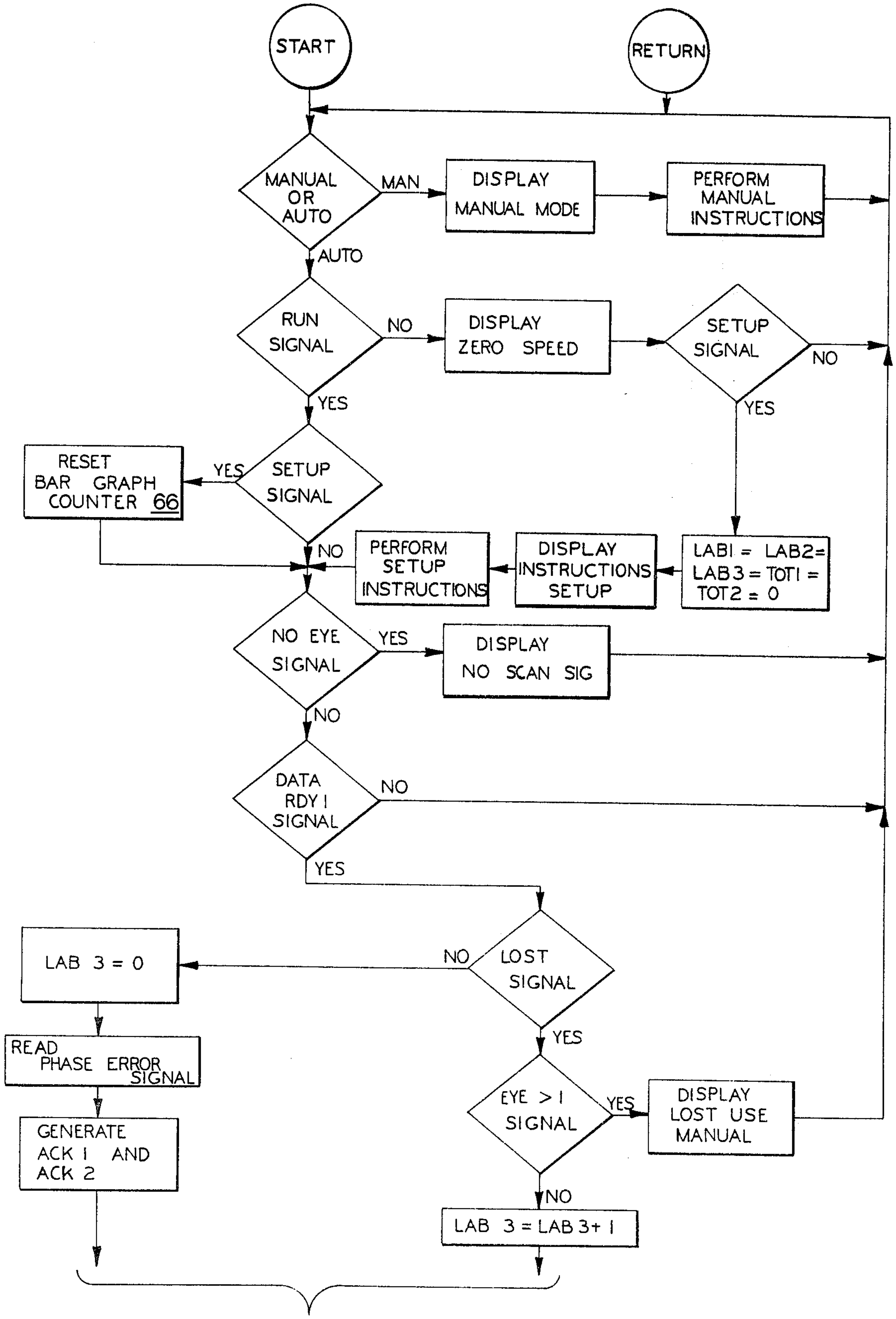
* and FIGS. 5*a,* 5*b,* and 5*c* are simplified flow diagrams which illustrate the operation of the control circuit.
Figure 5B:
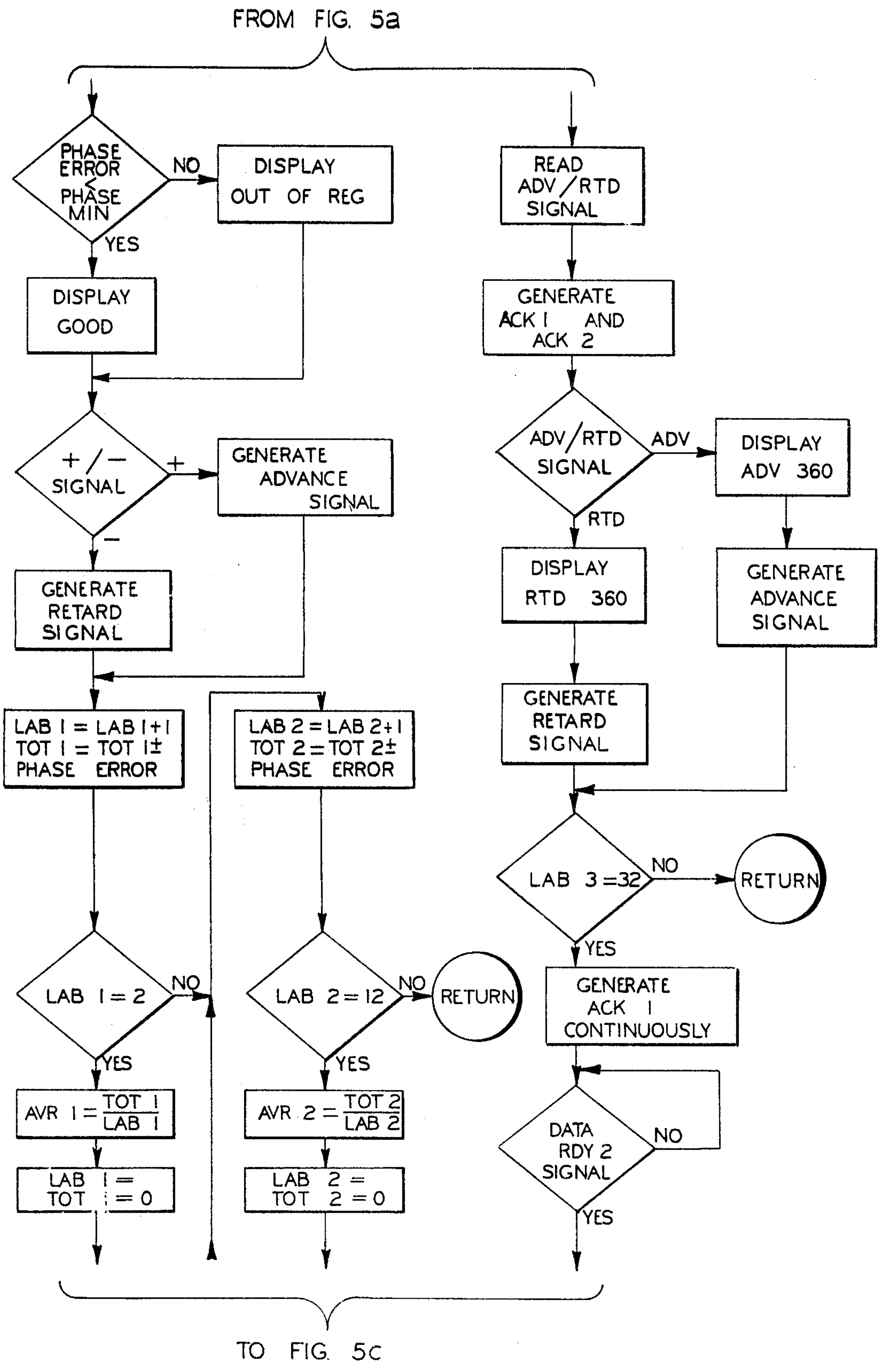
Figure 5C:
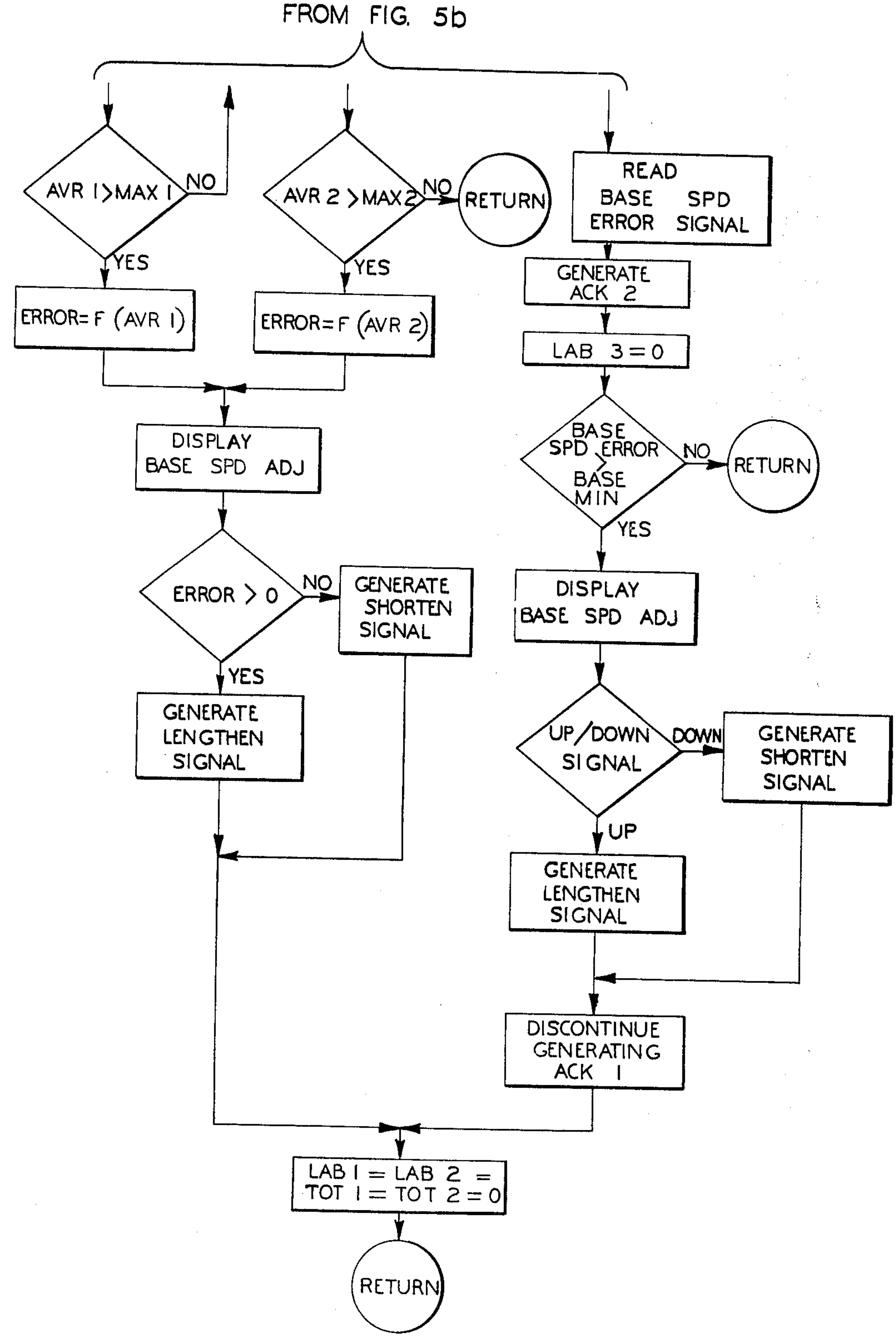

There is shown in FIGS. 5*a*, 5*b* and 5*c* a flow diagram which will be utilized to explain the operation of the registration control circuit 12. Although the majority of the instructions shown in FIGS. 5*a* through 5*c* are performed by the microcomputer 80 in conjunction with the priority control PLA 88, it should be noted that all the instructions could be performed by a single microcomputer or, conversely, additional PLA's could be provided to assist the microcomputer in performing the various control functions. As previously mentioned, the PLA 88 receives incoming data signals and decodes the signals on a priortized basis to signal the microcomputer 80 which instructions should be executed. The PLA 88 lessens the load on the microcomputer 80 such that a less expensive microcomputer can be used.

Referring to FIG. 5*a*, the control circuit is initiated at a circle "START" and then enters a decision point "MANUAL OR AUTO" to check whether any switches in the manual control 154 have been actuated by the operator. If the operator has set the machine into the manual mode, the program exits the decision point at "MAN" and enters a processing function "DISPLAY MANUAL MODE". The microcomputer 80 will then generate control and data signals to the alphanumeric display 158 to visually display the message "MANUAL MODE" to inform the operator of the present condition of the control. Next, the control enters a processing function "PERFORM MANUAL INSTRUCTIONS" wherein the microcomputer executes the manual instructions requested by the operator via the manual control 154. For example, the operator can instruct the control to either manually advance or retard the correction motor, or to increase or decrease the base speed. After performing the manual instructions, the control returns below the circle "START".

If the operator has not requested any manual instructions, the control exits the decision point "MANUAL OR AUTO" at "AUTO" and enters a decision point "RUN SIGNAL" to check whether the machine speed counter 65 is generating a "RUN" signal on the line 64. If no "RUN" signal is present, indicating the machine is stopped, the control exits the decision point at "NO" and enters a processing function "DISPLAY ZERO SPEED". The microcomputer 80 will then display the message "ZERO SPEED" to inform the operator that the machine is stopped. After displaying "ZERO SPEED", the control enters a decision point "SETUP SIGNAL" to check whether the operator has actuated the setup switch 62. If the setup switch has not been actuated, the control exits the decision point at "NO" and returns below the circle "START".

If the setup switch 62 has been actuated, the control exits the decision point "SETUP SIGNAL" at "YES" and enters a processing function "LAB 1=LAB 2=LAB 3=TOT 1=TOT 2=0" to set a number of variables, which will be discussed later, to zero. The control then enters a processing function "DISPLAY INST. SETUP" wherein the setup procedure as discussed in FIG. 4*c* is performed. After the setup operations have been performed, the control then enters a decision point "NO EYE SIGNAL".

If the machine speed counter 65 is generating the "RUN" signal on the line 64, the control will exit the decision point "RUN SIGNAL" at "YES" and enter a decision point "SETUP SIGNAL" to check whether the operator has actuated the setup switch 62. As previously mentioned, when the machine is in a run condition and the setup switch is actuated, the normal setup instructions will not be performed. However, the actuation of the setup switch 62 will cause the bar graph counter 66 to be reset which in turn centers the LED bar graph 70 and permits the operator to perform manual adjustments. Thus, if both the "RUN" signal and the "SETUP" signal are being generated, the control exits the decision point "SETUP SIGNAL" at "YES" and enters the processing function "RESET BAR GRAPH COUNTER 66". After resetting the bar graph counter 66, the control enters the decision point "NO EYE SIGNAL". If no setup signal is generated, the control branches from the decision point "SETUP SIGNAL" at "NO" and directly enters the decision point "NO EYE SIGNAL".

After entering the decision point "NO EYE SIGNAL", the control checks to see whether the eyemark counter 140 is generating a "NO EYE" signal on the line 146. If the "NO EYE" signal is present on the line 146, the control branches from the decision point at "YES" and enters a processing function "DISPLAY NO SCAN SIG". The microcomputer 80 will then inform the operator via the display 158 that the control is not receiving any scanner signal. Thus, the operator is now aware that either the scanner is not seeing any eyemarks on the printed labels or that the scanner itself may be defective. After displaying the "NO SCAN SIG" message, the control returns below the circle "START".

If the counter 140 is not generating the "NO EYE" signal on the line 146, this is an indication that the scanner is seeing at least one eyemark per label. The control then exists the decision point "NO EYE SIGNAL" at "NO" and enters a decision point "DATA RDY 1 SIGNAL". As previously mentioned, the phase error control 71 generates the "DATA RDY 1" signal on the line 86 when it has data ready which must be read by the microcomputer 80. If the "DATA RDY 1" signal is not present on the line 86, the control exits the decision point at "NO" and returns below the circle "START".

If the "DATA RDY 1" signal is being generated, this indicates that the phase error control 71 has data which must be read by the microcomputer 80. The control exits the decision point "DATA RDY 1 SIGNAL" at "YES" and enters the decision point "LOST SIGNAL" to determine whether the normal correction PLA 72 or the 360 mode PLA 74 is generating the correction signal. If the "LOST" signal is not being generated, this indicates that the eyemark was detected within the designated window area so that the normal correction PLA 72 is generating the PHASE ERROR signal on the lines 78. The control exits the decision point "LOST SIGNAL" at "NO" and enters a processing function "LAB 3=0" wherein the variable LAB 3 is set equal to zero. As will be discussed, the LAB 3 variable is utilized to keep track of the number of consecutive labels which fall outside of the designated window area. Thus, when the eyemark is detected within the window area, the variable LAB 3 is reset to zero. The control then enters a processing function "READ PHASE ERROR SIGNAL" wherein the microcomputer reads the phase error signal on the lines 78 through the I/O expander 82. After reading the signal, the control enters a processing function "GENERATE ACK 1 and ACK 2". The microcomputer then generates the respective acknowledge signal on the lines 102 and 122. The ACK 1 signal informs the phase error control 71 that the data has been read by clearing the DATA RDY 1 signal on the line 86. The ACK 2 signal on the line 122 will clear the DATA RDY 2 signal on the line 120.

The control then enters a decision point "PHASE ERROR<PHASE MIN" (FIG. 5*b*) to compare the PHASE ERROR signal which was read on the line 78 with a predetermined PHASE MIN value. If the PHASE ERROR VALUE is greater than the predetermined PHASE MIN value, the control exits the decision point at "NO" and enters a processing function "DISPLAY OUT OF REG". This display informs the operator that, although the eyemark was detected within the window area, the actual phase error was still greater than the predetermined minimum phase error defined by the PHASE MIN value. However, if the PHASE ERROR is less than the PHASE MIN value, the control will exit the decision point at "YES" and enter a processing function "DISPLAY GOOD". This display informs the operator that, not only was the eyemark detected within the designated window area, but also that the phase error was less than the predetermined minimum error.

After displaying either "GOOD" or "OUT OF REG", the control enters a decision point "+/− SIGNAL". The microcomputer 80 then checks the logic level of the signal line 84 to determine whether to advance or retard the correction motor. If the +/− signal is at a logic level which indicates that the correction motor must be advanced, the control exits the decision point at "+" and enters a processing function "GENERATE ADVANCE SIGNAL". The microcomputer 80 will then generate the ADVANCE signal to the correction motor driver 128. The motor driver 128 then provides the driving signal to the correction motor 38 on the lines 40. On the other hand, if the +/− signal is at a logic level indicating that the correction motor must be retarded, the control exits the decision point "+/− SIGNAL" at "−" and enters a processing function "GENERATE RETARD SIGNAL". The microcomputer 80 will then generate the RETARD signal to the motor driver 128. In accordance with the present invention, when the eyemark is detected within the designated window area, the "RETARD" and "ADVANCE" signals are generated directly proportional to the amount of actual phase error.

After generating the correction signals to the correction motor driver 128, the control enters a processing function "LAB 1=LAB 1+1; TOT 1=TOT 1± PHASE ERROR". Here, the label count variable LAB 1 is incremented by one while the PHASE ERROR is combined with a first error total TOT 1. In the case where the correction motor was advanced, the PHASE ERROR signal is added to the variable TOT 1, and if the correction motor was retarded, the PHASE ERROR is subtracted from the variable TOT 1.

After incrementing the label counter LAB 1 and calculating the error total TOT 1, the control then enters a decision point "LAB 1=2" for determining whether the total TOT 1 represents the total phase error for the last two labels. If the variable LAB 1=2, the control exits the decision point "LAB 1=2" at "YES" and enters a processing function "AVR 1=TOT 1/LAB 1". At this time, the microcomputer calculates a first average error AVR 1 by dividing the error total TOT 1 by the number of labels LAB 1. Next, the control enters a processing function "LAB 1=TOT 1=0" to reset the LAB 1 and the error total TOT 1 to zero. The control then enters a decision point "AVR 1>MAX 1" (FIG. 5*c*) to determine whether the average error AVR 1 is greater than a predetermined maximum error defined by MAX 1. If the average error AVR 1 is greater than the predetermined maximum MAX 1, this indicates that the amount of error detected over the last two labels is such that a base speed adjustment should be made. The control then enters a processing function "ERROR=F(AVR 1)" which includes instructions for calculating the ERROR signal as a function of the average error AVR 1.

If the label counter LAB 1 is not equal to two or the average AVR 1 is not greater than the predetermined MAX 1, the control exits the respective decision points at "NO" and enters a processing function "LAB 2=LAB 2+1; TOT 2=TOT 2± PHASE ERROR". Here, the label count variable LAB 2 is incremented by one while the PHASE ERROR is added to or subtracted from a second error total TOT 2, depending on the logic level of the +/− signal. The control then enters a decision point "LAB 2=12" to determine whether the second error total TOT 2 represents the total error over the last twelve labels. If LAB 2 does not equal twelve, the control returns below the circle "START". When "LAB 2=12", the control exits the decision point "LAB 2=12" at "YES" and enters a processing function "AVR 2=TOT 2/LAB 2" to calculate the average error which has occured over the last twelve labels. Next, the control enters a processing function "LAB 2=TOT 2=0" to reset the variables LAB 2 and TOT 2 to zero. The control then enters a decision point "AVR 2>MAX 2" to compare the average error AVR 2 over the last twelve labels to a second predetermined maximimum defined by MAX 2. If the average AVR 2 is not greater than the predetermined maximum MAX 2, the control exits the decision point "AVR 2>MAX 2" at "NO" and returns below the circle "START". However, if the average error AVR 2 is greater than the maximum error MAX 2, the control exits the decision point "AVR 2>MAX 2" at "YES" and enters a processing function "ERROR=F(AVR 2)". At this time, the control calculates the ERROR signal as a function of the average error AVR 2.

After calculating the ERROR value as a function of either the average AVR 1 or the average AVR 2, the control enters a processing function "DISPLAY BASE SPD ADJ" wherein the microcomputer 80 displays to the operator that a base speed adjustment is to be made. Next, the control enters a decision point "ERROR>0" to determine whether the base speed has to be increased or reduced. If the ERROR value is greater than zero, this is an indication that the base speed must be reduced. The control exits the decision point "ERROR>0" at "YES" and enters a processing function "GENERATE SHORTEN SIGNAL". Here, the microcomputer 80 will generate the SHORTEN signal to the stepping motor driver 130 to decrease the base speed. If the ERROR value is less than zero, the control exits the decision point "ERROR>0" at "NO" and enters a processing function "GENERATE LENGTHEN SIGNAL". The microcomputer 80 will then generate the LENGTHEN signal to the stepping motor driver 130 to increase the base speed. After generating either the SHORTEN or LENGTHEN signal, the control enters a processing function "LAB 1=LAB 2=TOT 1=TOT 2=0" to reset the label counters and error totals to zero. The control then returns below the circle "START".

Returning to the decision point "LOST SIGNAL" shown in FIG. 5*a*, the control exits the decision point at "YES" when the LOST signal is being generated. As previously mentioned, 360 mode PLA 74 generates the LOST signal on the line 94 when an eyemark has been detected out of the designated window area. The control then enters a decision point "EYE>1 SIGNAL" to determine whether the scanner is detecting more than one eye mark per label. If this is the case, the control exits the decision point at "YES" and enters a processing function "DISPLAY LOST USE MANUAL". This informs the operator that an eyemark has been detected out of the window area, and that the scanner is seeing more than one eyemark per label. Under these conditions, the control cannot determine which one of the eyemarks is supposed to be kept in registry and thus returns below the circle "START" after informing the operator of this condition. The operator must then use the manual control 154 to move the selected eye mark within the designated window area. The control can then be switched back to the automatic mode.

If the scanner is seeing only one eyemark per label, and the eyemark has fallen outside of the designated window area, the control can bring the eyemark back in registration. The control exits the decision point "EYE>1 SIGNAL" at "NO" and enters a processing function "LAB 3=LAB 3+1". The variable LAB 3 represents a label counter which is incremented each time an eyemark of a label is detected out of the designated window area. As will be discussed, when the label counter LAB 3 reaches a predetermined amount, and the eyemark has not been moved into the window area, the control will effect a base speed ajdustment. After incrementing the label counter LAB 3, the control enters a processing function "READ ADV/RTD SIGNAL" (FIG. 5*b*). The microcomputer 80 will then read the ADV/RTD signal via the PLA 88 and the data bus 90. The control then enters a processing function "GENERATE ACK 1 AND ACK 2". The ACK 1 clears the DATA RDY 1 signal and signals the PLA 74 that the ADV/RTD signal has been read, while the ACK 2 signal clears the DATA RDY 2 signal.

Next, the control enters a decision point "ADV/RTD SIGNAL" to determine in which direction to run the correction motor by checking the logic level of the ADV/RTD signal. If the correction motor is to be advanced, the control exits the decision point at "ADV" and enters a processing function "DISPLAY ADV 360". This display informs the operator that the control is in the gross phase correction mode, and the correction motor is being advanced. The control then enters the processing function "GENERATE ADVANCE SIGNAL" wherein the microcomputer 80 generates a signal to run the correction motor to full speed in the advance direction. If the ADV/RTD signal indicates that the correction motor should be retarded, the control exits the decision point "ADV/RTD SIGNAL" at "RTD" and enters a processing function "DISPLAY RTD 360". This display informs the operator that the correction motor will be running full speed in the retard direction. The control then enters a processing function "GENERATE RETARD SIGNAL" wherein the retard signal is supplied to the correction motor driver.

After generating either the ADVANCE or RETARD signal, the control enters a decision point "LAB 3=32" to determine whether the last thirty-two consecutive labels have eyemarks which have been detected out of the designated window area. If LAB 3 does not equal to thirty-two, the control exits at "NO" and returns below the circle "START". However, if LAB 3 equals thirty-two, the control branches from the decision point "LAB 3=32" at "YES" and enters a processing function "GENERATE ACK 1 CONTINUOUSLY". At this time, the microcomputer 80 will continuously generate the ACK 1 signal to the phase error control 71 to prevent the DATA RDY 1 signal from interrupting the microcomputer 80 while it is performing a base speed adjustment. Next, the control enters a decision point "DATA RDY 2 SIGNAL" and waits for the DATA RDY 2 signal to appear on the line 120, thus indicating that the BASE SPD ERROR signal is ready to be read on the lines 114. When there is no DATA RDY 2 signal present the control exits at "NO" and will continue to loop through the decision point "DATA RDY 2 SIGNAL" until a DATA RDY 2 signal is present. When the signal is present, the control exits the decision point at "YES" and enters a processing function "READ BASE SPD ERROR SIGNAL" (FIG. 5*c*). The microcomputer 80 will then read the BASE SPD ERROR signal on the lines 114.

As previously mentioned, the BASE SPD ERROR signal is generated at a value proportional to the actual base speed error. After reading the BASE SPD ERROR signal, the control then enters a processing function "GENERATE ACK 2" to clear the DATA RDY 2 signal and acknowledge to the base speed control 104 that the BASE SPD ERROR has been read. Next, the control enters a processing function "LAB 3=0" to reset the counter LAB 3 to zero. After resetting the label counter LAB 3, the control enters a decision point "BASE SPD ERROR>BASE MIN" to determine whether the error signal on the lines 114 is greater than a predetermined minimum base error defined by BASE MIN. If the BASE SPD ERROR is not greater than the predetermined minimum BASE MIN, the control exits at "NO" and returns below the circle "START". However, if the BASE SPD ERROR signal is greater than the BASE MIN, the control exits the decision point "BASE SPD ERROR>BASE MIN" at "YES" and enters a processing function "DISPLAY BASE SPD ADJ" to inform the operator that a base speed adjustment is to be made.

The control then enters a decision point "UP/-DOWN SIGNAL" to determine whether the value of the error signal on the lines 114 represents that the labels are too long or too short. If the signal indicates that the counter 110 has been counting in the down mode, this indicates that the labels being produced are too long. The control then exits the decision point at "down" and enters a processing function "GENERATE SHORTEN SIGNAL". The microcomputer 80 will then generate the SHORTEN signal at a value directly proportional to the actual base speed error to slow down the feed rolls 16. If the UP/DOWN signal is in the up mode, the control exists the decision point at "up" and enters a processing function "GENERATE LENGTHEN SIGNAL". The microcomputer will then generate the LENGTHEN signal to speed up the feed rolls and lengthen the labels. After effecting the base speed adjustment, the control enters a processing function "DISCONTINUE GENERATING ACK 1" wherein the ACK 1 signal is removed from the line 102 such that the microcomputer 80 will now be responsive to a DATA RDY 1 signal. The control then enters the processing function "LAB 1=LAB 2=TOT 1=TOT 2=0" before returning below the circle "START".

In summary, the present invention concerns a control circuit for an apparatus for cutting segments from a moving strip of material, such as labels from a moving roll or strip of labels. The apparatus includes a cutting means, means for driving the cutting means and the strip of material, means for generating a reference signal representing an actual position for each cut and means for generating a scan signal representing a desired position for each cut.

The control is set up by placing the cutting means and the leading end of a first segment in the cut position. The control is then manually jogged until an eyemark is aligned with a scanner to generate the scan signal. A first counter is loaded with a count total representing one half of a window. The drive means is then actuated and an encoder generates a cyclic or pulsed signal proportional to the speed of cutting to the first counter until an encoder reference signal is generated to freeze the count total. The count total from the first counter is then loaded into a second counter which counts to a count total representing the time between cuts and generates a new reference signal. The new reference signal defines the beginning of the window. The difference between the next scan signal and the midpoint of the window represents the difference between the actual position and the desired position for the cut. A phase error signal representing this difference is generated.

The control includes means responsive to the phase error signal for controlling the drive means to reduce the phase error signal for the next cut. The phase error signal controls a correction motor connected to a transmission between the drive motor and the feed rolls for the strip or material. If the average of two consecutive phase error signals exceeds a first predetermined amount, a base speed error proportional to the average is generated to control a stepping motor which changes the gear ratio of the transmission and the speed of the strip relative to the speed of cutting. If the average of twelve consecutive phase error signals exceeds a second predetermined amount, a second base speed error signal proportional to the average is generated to change the speed of the strip relative to the speed of cutting.

If the scan signal falls outside the window, the correction motor is actuated. As the speed of the apparatus is lowered, the time for a shorten correction is reduced. If the scan signal is outside the window for thirty-two consecutive segments, a maximum speed base speed correction is made.

Means are provided for generating a plurality of status signals representing conditions of the control circuit and the apparatus. The control includes means for storing a plurality of message signals representing the status conditions, means responsive to the status signals for generating the associated ones of the message signals, and means responsive to the message signals for visually indicating the condition of the apparatus. The means for visually indicating can be an alphanumeric display. The means for generating the message signals includes means for assigning a priority to each of the status signals such that only the message signal with the highest priority is generated.

In accordance with the provisions of the patent statutes, the principle and mode of operation of the invention has been explained and illustrated in its preferred embodiment. However, it must be understood that the invention may be practiced otherwise than as specifically illustrated and described without departing from the spirit or scope.

What is claimed is:

1. A method of controlling an apparatus for cutting individual labels from a moving strip of material, the apparatus having a cutting means and means for driving the cutting means and the strip of material, comprising the steps of:

(a) generating a phase error signal for successive labels representing the difference between an actual position of a cut for the labels and a desired position for said cut;

(b) controlling the drive means to reduce the phase error signal for succeeding labels in proportion to the magnitude of said difference represented by said phase error signal for preceding labels;

(c) summing a first predetermined number of consecutive phase error signals to generate a sum signal having a magnitude proportional to the sum of the differences represented by said phase error signals; and (d) controlling the drive means to change the speed of the strip of material relative to the speed of cutting of the cutting means in response to said sum signal magnitude exceeding a first predetermined value.

2. The method according to claim 1 wherein said step (c) is performed by summing said differences and dividing said sum by said first predetermined number of phase error signals to generate said sum signal with a magnitude proportional to the average of said differences.

3. The method according to claim 2 wherein said first predetermined number is two.

4. The method according to claim 2 wherein said first predetermined number is twelve.

5. The method according to claim 1 including a step (e) counting a second predetermined number of said phase error signals, and a step (f) controlling the drive means to change the speed of the strip of material relative to the speed of cutting of the cutting means at a predetermined rate in response to said second predetermined number exceeding a second predetermined value.

6. The method according to claim 5 wherein said second predetermined number is thirty-two.

7. A method of setting up a control circuit for an apparatus for cutting individual segments from a moving strip of material, the apparatus having a cutting means and means for driving the cutting means and the strip of material, comprising the steps of:

(a) generating a scan signal when successive segments are at a predetermined position relative to a desired cutting position;

(b) generating a cyclic signal, each cycle representing a predetermined increment of distance between cuts;

(c) generating a reference signal representing a predetermined position of the cutting means relative to an actual cutting position;

(d) counting the cycles of said cyclic signal between the generation of a first one of said scan signals and a first one of said reference signals in a first counting means; and (e) loading the count total of said first counting means into a second counting means in response to each reference signal subsequent to said first one and counting the cycles of said cyclic signal in said second counting means.

8. The method according to claim 7 including a step (f) controlling the means for driving in response to said scan signals and a count total of said second counting means to maintain the cutting means and the strip of material in registry.

9. The method according to claim 7 including a step (f) generating a new reference signal in response to a predetermined count total of said second counting means and a step (g) controlling the means for driving in response to said scan signals and said new reference signals to mantain the cutting means and the strip of material in registry.

10. The method according to claim 7 wherein said step (d) is performed by counting from a predetermined count total representing one half of the number of the cycles of the cyclic signal representing a window during which one of said scan signals should be generated.

* * * * *